United States Patent
Park et al.

(10) Patent No.: US 11,264,840 B2
(45) Date of Patent: Mar. 1, 2022

(54) WIRELESS POWER TRANSMISSION DEVICE

(71) Applicant: Samsung Electronics Co., Ltd., Suwon-si (KR)

(72) Inventors: Jae-Hyun Park, Suwon-si (KR);
Jae-Seok Park, Yongin-si (KR);
Young-Ho Ryu, Yongin-si (KR);
Sung-Ku Yeo, Suwon-si (KR);
Chong-Min Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

(21) Appl. No.: 16/348,002

(22) PCT Filed: Jun. 12, 2017

(86) PCT No.: PCT/KR2017/006078
§ 371 (c)(1),
(2) Date: May 7, 2019

(87) PCT Pub. No.: WO2018/088657
PCT Pub. Date: May 17, 2018

(65) Prior Publication Data
US 2019/0288566 A1    Sep. 19, 2019

(30) Foreign Application Priority Data

Nov. 8, 2016  (KR) .................... 10-2016-0148161

(51) Int. Cl.
| | |
|---|---|
| *H02J 7/00* | (2006.01) |
| *H02J 50/20* | (2016.01) |
| *H02J 50/40* | (2016.01) |
| *H02J 7/02* | (2016.01) |
| *H02J 5/00* | (2016.01) |
| *H02J 50/23* | (2016.01) |

(52) U.S. Cl.
CPC ............... *H02J 50/20* (2016.02); *H02J 5/00* (2013.01); *H02J 7/02* (2013.01); *H02J 7/025* (2013.01); *H02J 50/23* (2016.02); *H02J 50/40* (2016.02)

(58) Field of Classification Search
CPC .......... H02J 50/10; H02J 50/005; H02J 50/80; H02J 7/0042; H02J 50/90; H02J 50/20;
(Continued)

(56) References Cited

U.S. PATENT DOCUMENTS 8,890,761 B2 * 11/2014 Toyao ................... H01Q 21/08
                                                                    343/833
2003/0218573 A1    11/2003 Yoo et al.
(Continued)

FOREIGN PATENT DOCUMENTS

| EP | 0 848 488 A1 | 6/1998 |
|---|---|---|
| EP | 1 542 313 A1 | 6/2005 |

(Continued)

OTHER PUBLICATIONS

European Search Report dated Jul. 30, 2019, issued in European Patent Application No. 17870382.3.
(Continued)

*Primary Examiner* — Binh C Tat
(74) *Attorney, Agent, or Firm* — Jefferson IP Law, LLP

(57) ABSTRACT

A wireless power transmission device radiating electromagnetic waves is disclosed. The wireless power transmission device can comprise: a first circuit board; a first conductive member mounted on a first surface of the first circuit board; a first ground member mounted on a second surface facing opposite from the first surface; and an electrical circuit disposed on a position, on the second surface of the first circuit board, which does not overlap the first ground
(Continued)

member and for controlling the radiation of electromagnetic waves from the first circuit board.

5 Claims, 10 Drawing Sheets

(58) Field of Classification Search
CPC ........ H02J 50/40; H02J 50/05; H02J 7/00034; H02J 7/025; H02J 50/12; H02J 50/70; H02J 5/00; H02J 50/23; H02J 7/0044; H02J 7/0047; H02J 7/02; H01Q 1/2283; H01Q 1/38; H01Q 1/2225; H04B 10/60; H04B 10/564; H01S 5/02345; H01L 33/0045
USPC ................................................ 320/106–115
See application file for complete search history.

(56) References Cited

U.S. PATENT DOCUMENTS

| | | |
|---|---|---|
| 2004/0027298 A1 | 2/2004 | Iguchi et al. |
| 2011/0134010 A1* | 6/2011 | Toyao ...................... H01Q 9/42 343/844 |
| 2013/0286583 A1 | 10/2013 | Walsh |
| 2014/0070763 A1 | 3/2014 | Chiles et al. |
| 2014/0191713 A1* | 7/2014 | Hong ...................... H02J 50/40 320/108 |
| 2014/0347250 A1 | 11/2014 | Yanagi |
| 2015/0022022 A1 | 1/2015 | Zeine |
| 2015/0311590 A1* | 10/2015 | Jung ...................... H01Q 1/273 343/788 |
| 2016/0020648 A1 | 1/2016 | Contopanagos |
| 2019/0173542 A1* | 6/2019 | Johnson ................ H01Q 21/20 |

FOREIGN PATENT DOCUMENTS

| | | |
|---|---|---|
| KR | 10-2014-0142875 A | 12/2014 |
| KR | 10-2015-0133092 A | 11/2015 |
| KR | 10-2016-0093127 A | 8/2016 |

OTHER PUBLICATIONS

European Search Report dated Oct. 18, 2019, issued in European Patent Application No. 17870382.3.

* cited by examiner (a)

(b)

(a)

(b)

(a)

(b)

WIRELESS POWER TRANSMISSION DEVICE

CROSS-REFERENCE TO RELATED APPLICATION(S)

This application is a U.S. National Stage application under 35 U.S.C. § 371 of an International application number PCT/KR2017/006078, filed on Jun. 12, 2017, which is based on and claimed priority of a Korean patent application number 10-2016-0148161, filed on Nov. 8, 2016, in the Korean Intellectual Property Office, the disclosure of which is incorporated by reference herein in its entirety.

TECHNICAL FIELD

The disclosure relates to a device for supplying power to other electronic devices using a wireless power transmission method. In particular, the disclosure relates to a wireless power transmission device in which a plurality of circuit boards is arranged in layers so as to radiate electromagnetic waves to other electronic devices, thereby transmitting wireless power.

BACKGROUND ART

A wireless power transmission method is a method of supplying electric power to other electronic devices without wires. Recently, a variety of wireless power transmission methods have been developed. The wireless power transmission methods may include, for example, a magnetic induction method, a microwave method, a resonant magnetic coupling method, or the like.

The magnetic induction method is a method using, for example, an electromagnetic induction principle in which current is induced in a reception coil due to the influence of a magnetic field when the magnetic field is generated in a power transmission coil. In the electromagnetic wave method, for example, when electromagnetic waves are generated in a transmission unit, the reception unit receives electromagnetic waves using a plurality of power reception antennas, converts the received electromagnetic waves into electric power, and uses the electric power. In the electromagnetic wave method, the reception unit may include, for example, a rectenna structure. The magnetic resonance method generates a magnetic field that vibrates at a resonance frequency in a transmission coil or a resonator, and energy is transmitted to a reception coil or a resonator designed to operate at the same resonance frequency.

DETAILED DESCRIPTION OF THE INVENTION

Technical Problem

Among various wireless power transmission methods, a wireless power transmission method using electromagnetic waves is able to transmit power to a target electronic device located relatively far away in comparison with other wireless power transmission methods.

In order to increase the transmission efficiency of the wireless power transmission method, an antenna including a plurality of conductive members is required. However, when the number of conductive members is increased, the antenna may be enlarged. In order to solve this problem, a circuit board including the conductive members may be disposed to be stacked, but in this case, the transmission efficiency of the electromagnetic waves may not increase in proportion to the number of stacked circuit boards.

Technical Solution

A wireless power transmission device that radiates electromagnetic waves according to an embodiment includes a first circuit board, a first conductive member mounted on a first face of the first circuit board, a first ground member mounted on a second face that faces away from the first face, and an electric circuit disposed in the second face of the first circuit board at a position which does not overlap the first ground member, the electric circuit being configured to control radiation of electromagnetic waves radiated from the first circuit board.

In the wireless power transmission device that radiates electromagnetic waves according to an embodiment, the electric circuit may control one of an output and a phase of the radiated electromagnetic waves.

In the wireless power transmission device that radiates electromagnetic waves according to an embodiment, the first ground member may be mounted in a portion of the second face of the first circuit board corresponding to a position at which the first conductive member is mounted.

The wireless power transmission device that radiates electromagnetic waves according to an embodiment may further include a second circuit board. A second conductive member may be mounted on a first face of the second circuit board, a second ground member may be mounted on a second face that faces away from the first face, and the first face of the second circuit board may be disposed to face the second face of the first circuit board.

The wireless power transmission device that radiates electromagnetic waves according to an embodiment may further include an electric circuit disposed between the second face of the first circuit board and the first face of the second circuit board.

In the wireless power transmission device that radiates electromagnetic waves according to an embodiment, the second ground member may be mounted in a portion of the second face of the second circuit board corresponding to a position at which the second conductive member is mounted.

The wireless power transmission device according to an embodiment may further include a third circuit board disposed between the second face of the first circuit board and the first face of the second circuit board, and the electric circuit may be mounted on the third circuit board.

The wireless power transmission device according to an embodiment may further include an insulator disposed between the first face of the first circuit board on which the first conductive member is mounted and the second face of the first circuit board on which the first ground member is mounted.

A wireless power transmission device that radiates electromagnetic waves according to an embodiment may include a first circuit board, a first conductive member mounted on a first face of the first circuit board, a first ground member mounted on a second face that faces away from the first face, and a transmission line disposed in the second face of the first circuit board at a position which does not overlap the first ground member so as to supply power to the first circuit board.

In the wireless power transmission device according to an embodiment, the first ground member may be mounted in a portion of the second face of the first circuit board corresponding to a position at which the first conductive member is mounted.

In the wireless power transmission device according to an embodiment, the transmission line may include a coaxial cable.

Advantageous Effects

According to various embodiments of the disclosure, a ground member is mounted on the second face of a circuit board corresponding to a first face of a circuit board on which a conductive member is mounted, so that it is possible to improve the electromagnetic wave transmission efficiency of another circuit board, which forms a stacked structure of circuit boards.

MODE FOR CARRYING OUT THE INVENTION

Figure 1:
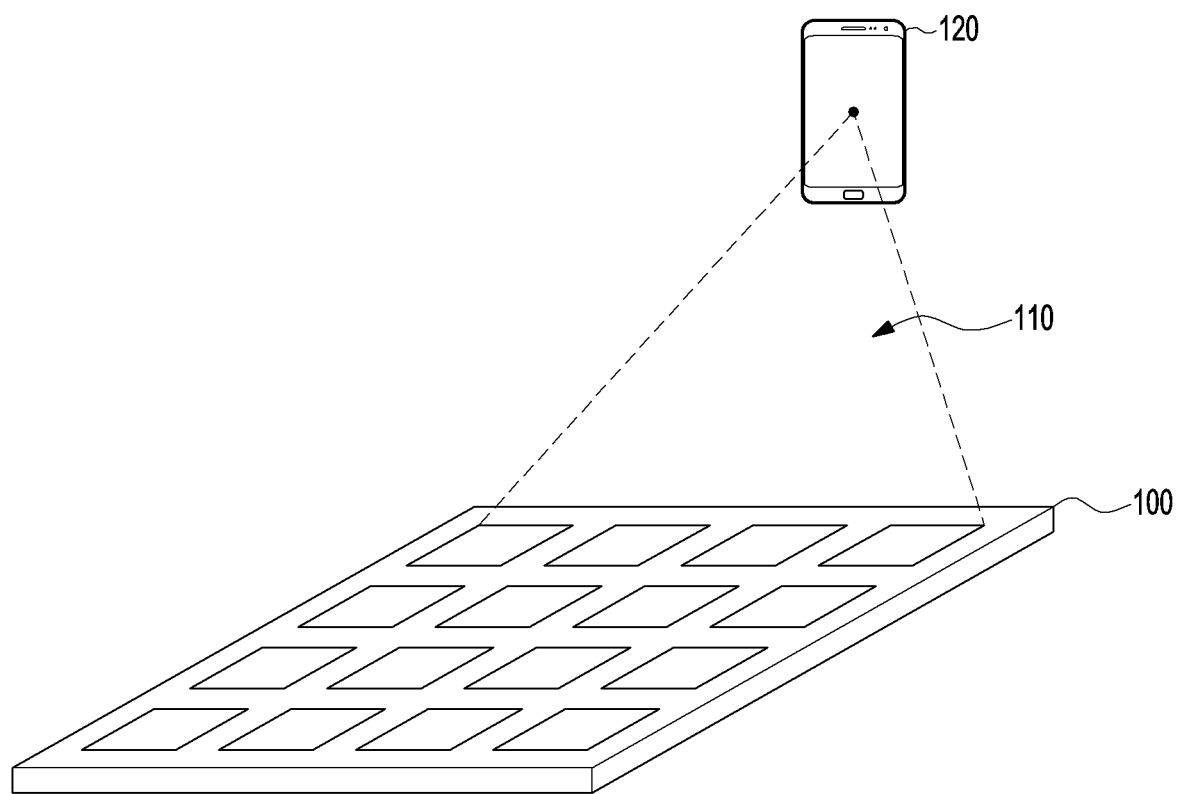
FIG. 1 is a view illustrating the situation in which a wireless power transmission device according to an embodiment of the disclosure transmits power to an electronic device using a wireless power transmission method.

Hereinafter, various embodiments of the disclosure will be described with reference to the accompanying drawings. However, it should be understood that there is no intent to limit the disclosure to the particular forms disclosed herein; rather, the disclosure should be construed to cover various modifications, equivalents, and/or alternatives of embodiments of the disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the disclosure, the expression "A or B", "at least one of A and/or B", or "one or more of A and/or B" may include all possible combinations of the items listed. For example, the expression "A or B", "at least one of A and B", or "at least one of A or B" may include (1) at least one A, (2) at least one B, or (3) both at least one A and at least one B. The expression "a first", "a second", "the first", or "the second" used in various embodiments of the disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it could be understood that when an element (e.g., a first element) is referred to as being "directly connected to" or "directly coupled to" another element (e.g., a second element), there is no intervening element (e.g., a third element) between the element and the other element.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and may not be intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio layer-3 (MP3) player, a mobile medical device, a camera, and a wearable device.

According to various embodiments, the wearable device may include at least one of an accessory type (e.g., a watch, a ring, a bracelet, an anklet, a necklace, a pair of glasses, a contact lens, or a Head-Mounted Device (HIVID)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic device for a ship (e.g., a navigation device for a ship or a gyro-compass), avionics, security devices, an automotive head unit, a robot for home or industry, an Automatic Teller's Machine (ATM) in banks, Point Of Sale (POS) in a shop, or internet device of things (e.g., a light bulb, various sensors, an electric or gas meter, a sprinkler device, a fire alarm, a thermostat, a streetlamp, a toaster, sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the disclosure may be a combination of one or more of the aforementioned various devices.

The electronic device according to some embodiments of the disclosure may be a flexible device. Further, the electronic device according to an embodiment of the disclosure is not limited to the aforementioned devices, and may include a new electronic device according to the development of technology.

FIG. 1 is a view illustrating the situation in which a wireless power transmission device according to various embodiments transmits power to an electronic device using a wireless power transmission method.

Referring to FIG. 1, a wireless power transmission device 100 may radiate electromagnetic waves 110 toward an electronic device 120. The wireless power transmission device 100 may radiate electromagnetic waves 110 having a frequency of, for example, a 2.45 GHz or 5.8 GHz band toward the electronic device 120 as a wireless charging object.

The electronic device 120 may receive the electromagnetic waves 110 radiated by the wireless power transmission device 100 using a receiver (not illustrated) included in the electronic device 120. The receiver may have a rectenna structure. The electronic device 120 may convert the electromagnetic waves 110 received through the receiver into electric power, and may use the electric power.

Figure 2:
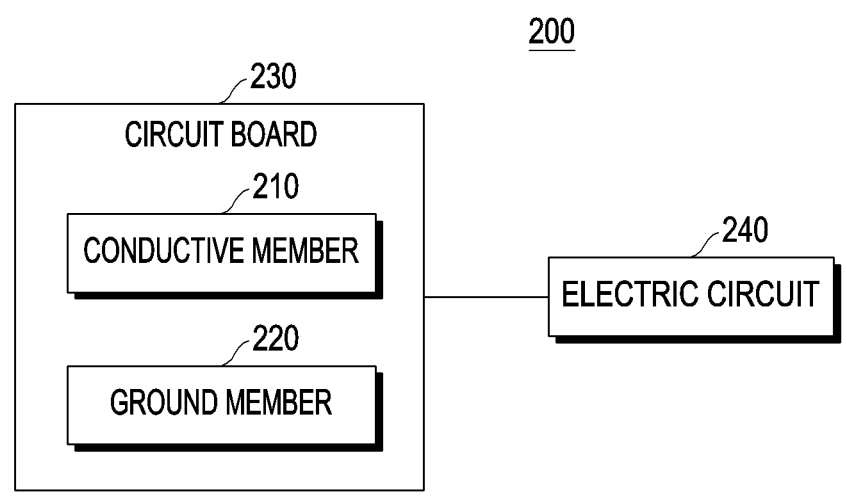
FIG. 2 is a schematic block diagram of a transmission unit that radiates electromagnetic waves in a wireless power transmission device according to an embodiment of the disclosure.

FIG. 2 is a schematic block diagram of a transmission unit 200 that radiates electromagnetic waves in a wireless power transmission device according to various embodiments.

Referring to FIG. 2, the transmission unit 200 of the wireless power transmission device 100 may include a conductive member 210, a ground member 220, a circuit board 230, and an electric circuit 240. The conductive member 210 may include, for example, a metal member. However, the disclosure is not limited thereto. The wireless power transmission device 100 may further include components necessary for radiating electromagnetic waves, or may omit some of the components described above.

The circuit board 230 may include a first face and a second face. The first face and the second face may face away from each other. The conductive member 210 and the ground member 220 may be mounted on a circuit board. For example, the conductive member 210 may be mounted on the first face of the circuit board 230. In addition, the ground member 220 may be mounted on the second face of the circuit board 230.

The circuit board 230 may include an insulator. For example, the circuit board 230 may include an insulator between the first face of the circuit board 230 on which the conductive member 210 is mounted and the second face of the circuit board 230 on which the ground member 220 is mounted. The insulator is a material that does not conduct electricity, and may include, for example, glass, ebonite, diamond, rubber, or the like, but is not limited thereto as long as the material does not conduct electricity. The insulator may, for example, block the unintended flow of current between the first and second faces.

The conductive member 210 may serve as an antenna radiator that receives current transmitted from the electric circuit 240 included, for example, in the wireless power transmission device 100 and radiates power. The ground member 220 may serve as a passage through which the current transmitted from the electric circuit 240 returns to the electric circuit 240.

According to various embodiments, the transmission unit 200 of the wireless power transmission device 100 may include a circuit board 230, a conductive member 210 disposed on the first face of the circuit board 230, a conductive member 210 disposed on the first face of the circuit board 230, a ground member 220 mounted on the second face of the circuit board 230 in correspondence to the position at which the conductive member 210 is mounted, and an electric circuit 240 that controls the phase of the electromagnetic waves radiated from the conductive member 210.

The electric circuit 240 may be implemented, for example, in the form of a printed circuit board (PCB), which may be located in a place in which the PCB does not overlap the ground member 220 and may be located between other circuit boards (not illustrated) disposed to overlap the circuit board 230, thereby supporting the circuit boards. However, the disclosure is not limited thereto. For example, the wireless power transmission device 100 may be provided with an electric circuit 240 by stacking additional members on the ground member 220.

Figure 3:
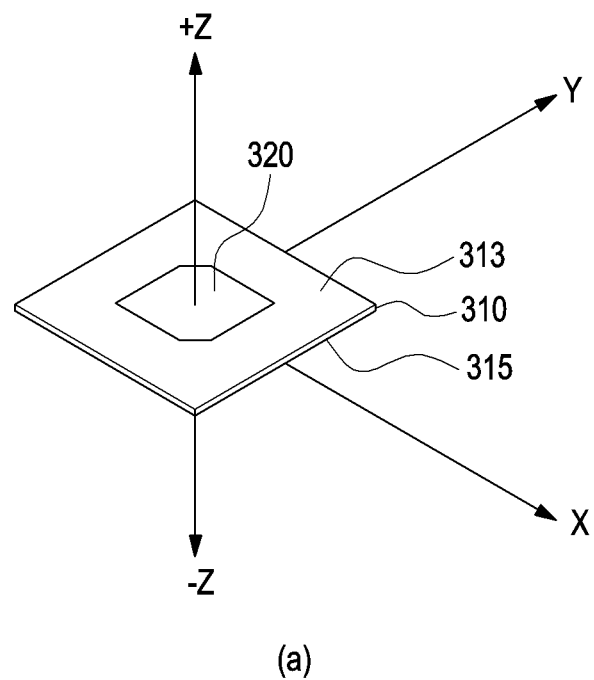
FIG. 3 is a view illustrating a circuit board on which a conductive member is mounted in a wireless power transmission device according to an embodiment of the disclosure.
Figure 3:
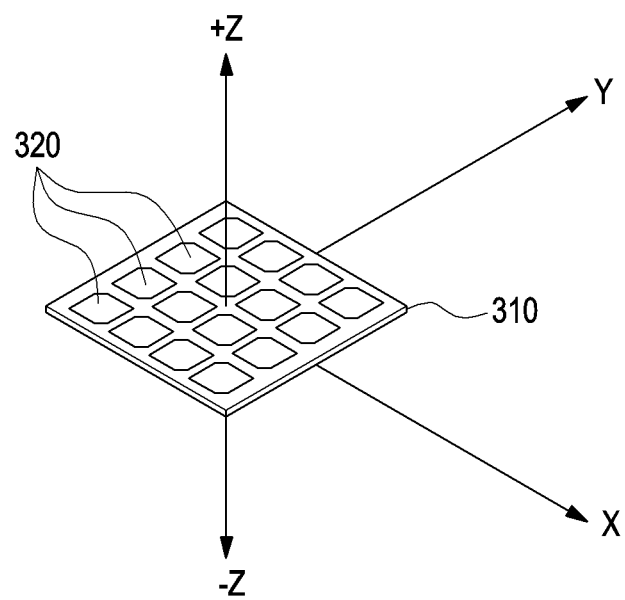

FIG. 3 (a) is a view illustrating a circuit board on which a conductive member is mounted in a wireless power transmission device according to an embodiment of the disclosure.

Referring to FIG. 3 (a), with reference to the XYZ coordinate system, the circuit board 310 may be arranged parallel to the XY plane, that is, orthogonal to the Z axis. The first face 313 of the circuit board 310 may be a face oriented in the +Z axis direction in the XY plane. The second face 315 of the circuit board 310 may be a face oriented in the −Z axis direction in the XY plane.

According to various embodiments, the conductive member 320 may be mounted on the first face 313 of the circuit board 310. The conductive member 320 may have various shapes. For example, the conductive member 320 may have a tetragonal or hexagonal shape. When the conductive member 320 has a tetragonal shape, the wireless power transmission device 100 may radiate electromagnetic waves in the form of linear polarization. The linear polarization may mean, for example, that the vibration direction of electromagnetic waves is located on one plane.

When the conductive member 320 has a hexagonal shape, the wireless power transmission device 100 may radiate electromagnetic waves in the form of circular polarization. The circular polarization may mean, for example, a shape in which the deflecting face of linear polarization rotates at a constant angular velocity about the advancing direction of light.

According to various embodiments, a ground member (not illustrated) may be mounted on a partial area of the second face 315 of the circuit board 310, which corresponds to the mounting position of the conductive member 320 disposed on first face 313 of the conductive member 310 or on the entire second face 315 of the circuit board 310.

Electromagnetic waves may be radiated when a coaxial line (not illustrated) or the like is connected to the circuit board 310 on which the conductive member 320 is placed to feed power, that is, to supply current to the conductive member 320.

FIG. 3 (a) illustrates an example in which one conductive member 320 is mounted on the circuit board 310, but a plurality of conductive members 320 may be mounted on the circuit board 310.

Referring to FIG. 3 (b), the circuit board 310 may include a plurality of conductive members 320. The conductive members 320 may be disposed on the circuit board 310 to maintain a predetermined interval therebetween. The interval of the conductive members 320 may be determined in consideration of coupling between the conductive members 320 and ease of electromagnetic wave control. When the number of conductive members 320 increases, the electromagnetic wave radiation performance of the wireless power transmission device 100 can be improved and the directivity direction of the electromagnetic waves toward the electronic device 120 can be more precisely adjusted.

Figure 4:
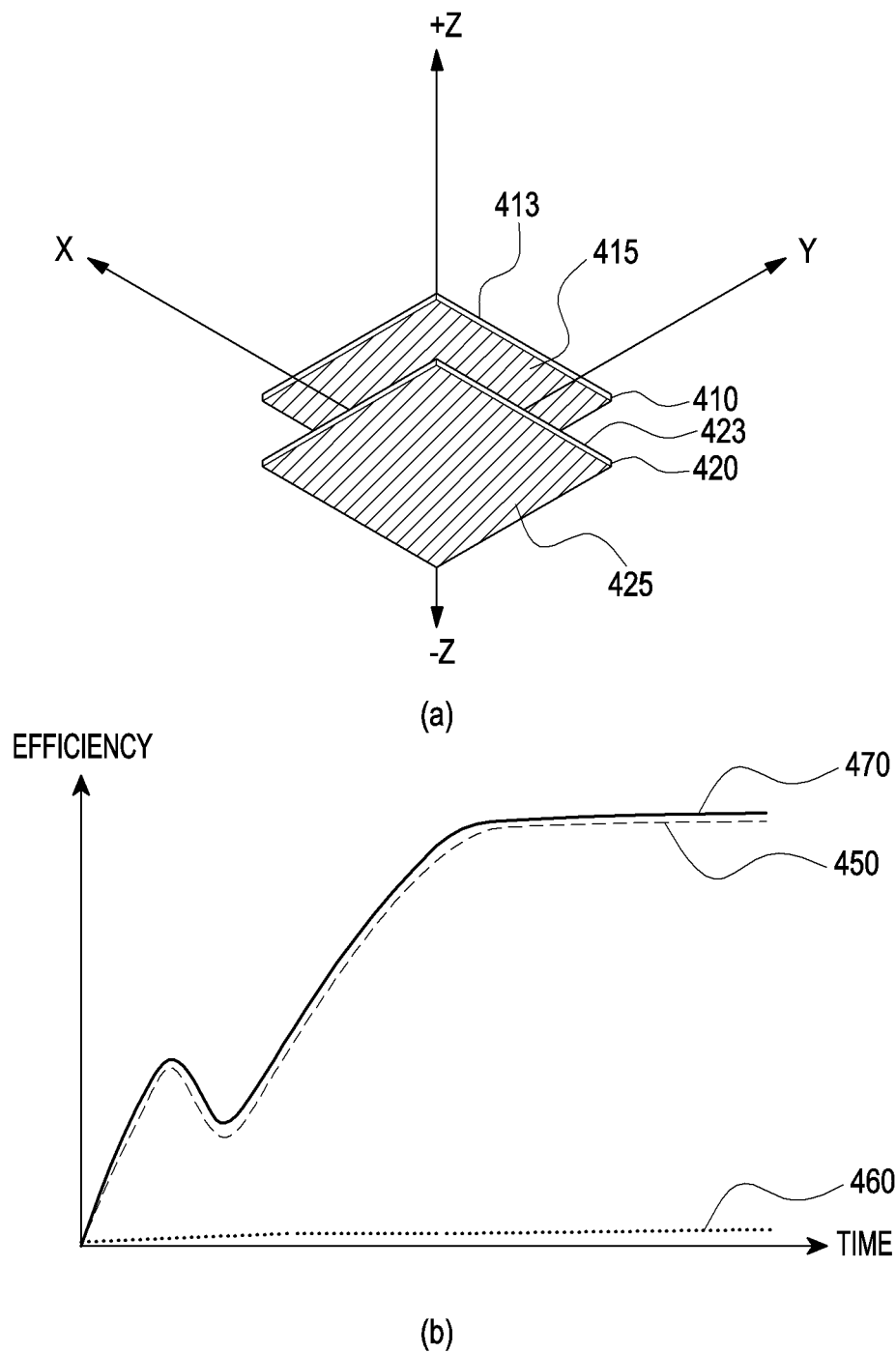
FIG. 4 is a view illustrating electromagnetic wave radiation efficiency.

FIG. 4 (a) is a view illustrating electromagnetic wave radiation efficiency.

Referring to FIG. 4 (a), the wireless power transmission device 100 may radiate electromagnetic waves using a first circuit board 410 and a second circuit board 420 on which a plurality of conductive members are arranged. With reference to the XYZ coordinate system, the first circuit board 410 and the second circuit board 420 may be arranged parallel to the XY plane, that is, orthogonal to the Z axis.

The first face 413 of the first circuit board 410 may be a face oriented in the +Z axis direction, and the second face 415 may be a face oriented in the −Z axis direction. Similarly, the first face 423 of the second circuit board 420 may be a face oriented in the +Z axis direction, and the second face 425 may be a face oriented in the −Z axis direction. In this case, the second face 415 of the first circuit board 410 and the first face 423 of the second circuit board 420 may face each other.

According to various embodiments, a plurality of conductive members (not illustrated) may be disposed on the first face 413 of the first circuit board 410, as illustrated in FIG. 3B. Similarly, a plurality of conductive members (not illustrated) may also be disposed on the first face 423 of the second circuit board 420, as illustrated in FIG. 3B.

A ground member may be mounted on the second face 415 of the first circuit board 410. Similarly, a ground member may also be mounted on the second face 425 of the second circuit board 420. The ground member may be entirely mounted on the second face 415 of the first circuit board 410 and the second face 425 of the second circuit board 420.

According to various embodiments, the first circuit board 410 and the second circuit board 420 may be disposed with a predetermined spacing therebetween. The wireless power transmission device 100 may further include an electric circuit (not illustrated) capable of connecting a processor (not illustrated) that controls the operation of the wireless power transmission device 100 with the first circuit board 410 and the second circuit board 420. The wireless power transmission device 100 may feed power to the first circuit board 410 and the second circuit board 420 using an electric circuit (not illustrated). In this case, the plurality of conductive members disposed on the first circuit board 410 of the wireless power transmission device 100 and the plurality of conductive members disposed on the second circuit board 420 may radiate electromagnetic waves in the +Z axis direction.

FIG. 4 (b) is a view representing the electromagnetic wave radiation efficiency of the wireless power transmission device having the structure illustrated in FIG. 4 (a).

Referring to the graph of FIG. 4 (b), the X axis may represent time and the Y axis may represent electromagnetic wave radiation efficiency. It can be seen that at the initial stage of radiating the electromagnetic waves by the wireless power transmission device 100, the electromagnetic wave radiation efficiency increases as a whole, and, after a predetermined period of time, the electromagnetic wave radiation efficiency remains at a constant value.

A first curve 450 in the graph representing the radiation efficiency of the electromagnetic wave with time may show the radiation efficiency of the electromagnetic waves radiated through the plurality of conductive members disposed on the first circuit board 410. As illustrated, the radiation efficiency of the electromagnetic waves radiated through the plurality of conductive members arranged on the first circuit board 410 increases at the initial stage of radiation, and after a predetermined period of time, may remain at constant radiation efficiency.

A second curve 460 in the graph representing the radiation efficiency of the electromagnetic wave with time may show the radiation efficiency of the electromagnetic waves radiated through the plurality of conductive members disposed on the second circuit board 420. As illustrated, it can be seen that the radiation efficiency of the electromagnetic waves radiated through the plurality of conductive members arranged on the second circuit board 420 is not high after a predetermined period of time, but is constantly measured for a predetermined period of time. The fact that the radiation efficiency of the electromagnetic waves radiated from the second circuit board is low is greatly affected by the ground member mounted on the second face 425 of the first circuit board 410. That is, the electromagnetic waves radiated in the +Z-axis direction by the second circuit board 420 can be reflected by the ground member mounted on the second face 425 of the first circuit board 410.

A third curve 470 of the graph is the sum of the radiation efficiency of the electromagnetic waves radiated from the first circuit board 410 and the radiation efficiency of the electromagnetic waves radiated from the second circuit board 420. The radiation efficiency of the second circuit board 420 is not high but is added to the radiation efficiency of the first circuit board 410, so that the radiation efficiency of the entire wireless power transmission device 100 can be maintained to be similar to but higher than the radiation efficiency of the first circuit board 410 by about 3.4%.

Figure 5:
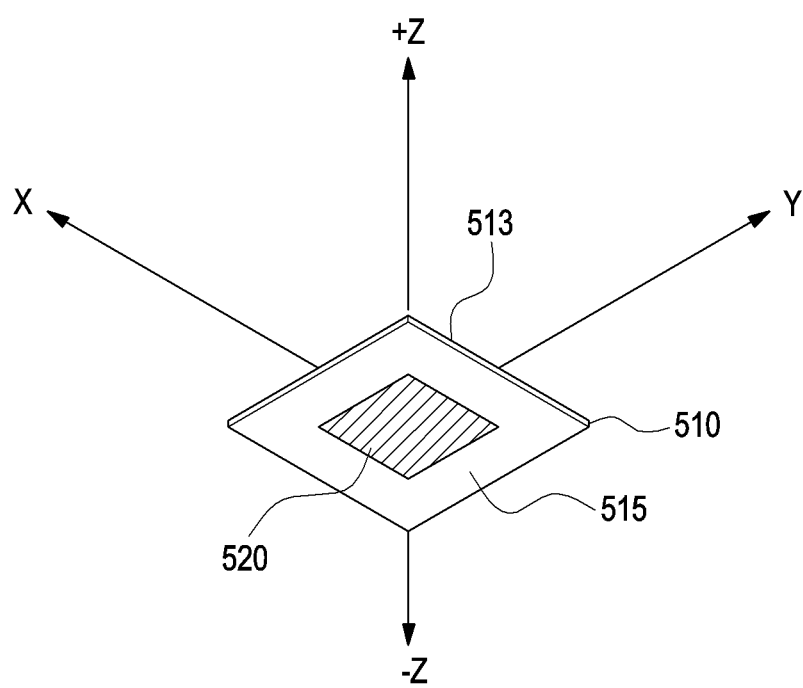
FIG. 5 is a view illustrating a circuit board on which a ground member is mounted in a wireless power transmission device according to an embodiment of the disclosure.

FIG. 5 is a view illustrating a circuit board on which a ground member is mounted in a wireless power transmission device according to various embodiments.

Referring to FIG. 5, with reference to the XYZ coordinate system, the circuit board 510 may be arranged parallel to the XY plane, that is, orthogonal to the Z axis. The first face 513 of the circuit board 510 may be a face oriented in the +Z axis direction in the XY plane. The second face 515 of the circuit board 510 may be a face oriented in the −Z axis direction in the XY plane.

According to various embodiments, a ground member 520 may be mounted on the second face 515 of the circuit board 510. However, when the ground member 520 is mounted on the entire second face 515 of the circuit board 510 as described above with reference to FIG. 4, when a plurality of circuit boards are stacked to radiate electromagnetic waves, the radiation efficiency of electromagnetic waves may not be improved. For example, when a plurality of circuit boards 410 and 420 are arranged along the Z axis, most of the electromagnetic waves radiated from the second circuit board 420 can be reflected on the ground member of the first circuit board 410. Accordingly, in the wireless power transmission device 100 according to various embodiments, a second ground member 520 may be mounted in a portion of the second face 315 of the circuit board 310, which corresponds to the position at which a conductive member (not illustrated) in the first face 513 of the circuit board 510 is mounted.

Figure 6:
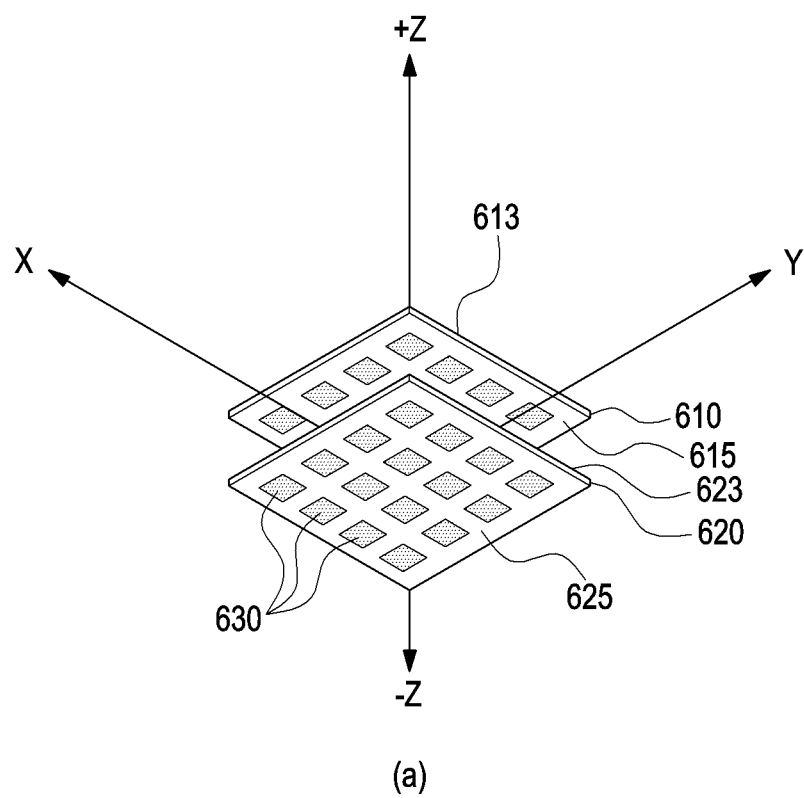
FIG. 6 is a view illustrating electromagnetic wave radiation efficiency.
Figure 6:
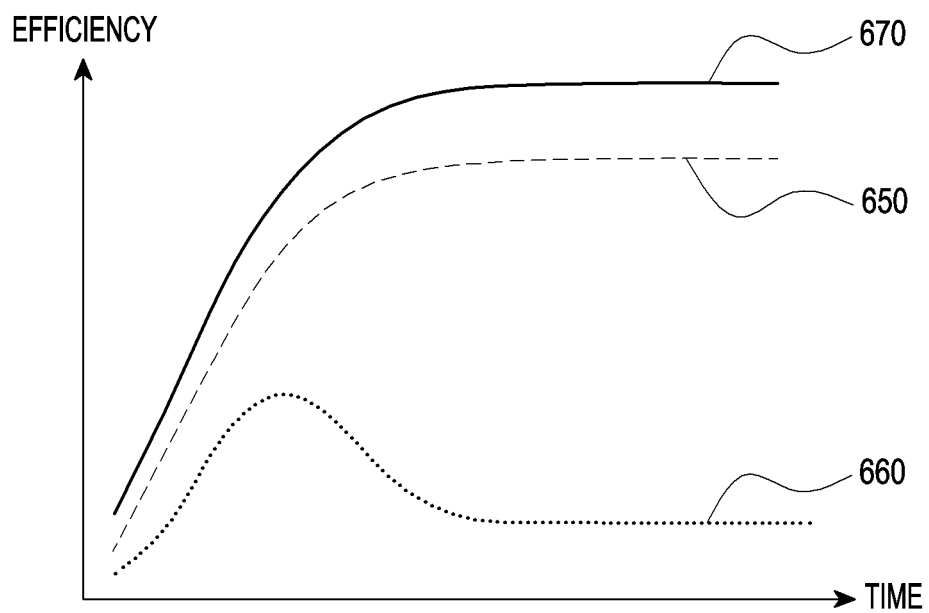

FIG. 6 is a view illustrating electromagnetic wave radiation efficiency.

Referring to FIG. 6 (*a*), the wireless power transmission device 100 may radiate electromagnetic waves in the +Z-axis direction using a first circuit board 610 and a second circuit board 620 on which a plurality of conductive members are arranged. With reference to the XYZ coordinate system, the first circuit board 610 and the second circuit board 620 may be arranged parallel to the XY plane, that is, orthogonal to the Z axis.

The first face 613 of the first circuit board 610 may be a face oriented in the +Z axis direction, and the second face 615 may be a face oriented in the −Z axis direction. Similarly, the first face 623 of the second circuit board 620 may be a face oriented in the +Z axis direction, and the second face 625 may be a face oriented in the −Z axis direction. In this case, the second face 615 of the first circuit board 610 and the first face 623 of the second circuit board 620 may face each other.

According to various embodiments, a plurality of conductive members (not illustrated) may be arranged on the first face 613 of the first circuit board 610, as illustrated in FIG. 3 (*b*). Similarly, a plurality of conductive members (not illustrated) may also be arranged on the first face 623 of the second circuit board 620, as illustrated in FIG. 3 (*b*).

A ground member 630 may be mounted on the second face 615 of the first circuit board 610. Similarly, a ground member 630 may also be mounted on the second face 625 of the second circuit board 620. That is, the ground members 630 may be mounted on the second face 615 of the first circuit board 610 and the second face 625 of the second circuit board 620, respectively.

For the radiation efficiency of electromagnetic waves of each of the circuit boards 610 and 620 as described above with reference to FIG. 5, in the wireless power transmission device 100 according to various embodiments, the ground member 630 may be mounted only in a portion of the second face 615 of the first circuit board 610, which corresponds to the position at which an individual conductive member (not illustrated) is mounted in the first face 613 of the first circuit board 610. Similarly, in the wireless power transmission device 100, the ground member 630 may be mounted only in a portion of the second face 625 of the second circuit board 620, which corresponds to the position at which an individual conductive member (not illustrated) in the first face 623 of the circuit board 620 is mounted.

According to various embodiments, the first circuit board 610 and the second circuit board 620 may be disposed with a predetermined spacing therebetween. For example, the spacing between a plurality of disposed circuit boards including the first circuit board 610 and the second circuit board 620 may be determined through tests. The wireless power transmission device 100 may feed power to the first circuit board 610 and the second circuit board 620 using an electric circuit (not illustrated). In this case, the wireless power transmission device 100 may radiate electromagnetic waves in the +Z axis direction.

FIG. 6 (*b*) is a view representing the electromagnetic wave radiation efficiency of the wireless power transmission device 100 having the structure illustrated in FIG. 6 (*a*).

Referring to the graph of FIG. 6 (*b*), the X axis may represent time and the Y axis may represent electromagnetic wave radiation efficiency. It can be seen that at the initial stage of radiating the electromagnetic waves by the wireless power transmission device 100, the electromagnetic wave radiation efficiency increases as a whole, and, after a predetermined period of time, the electromagnetic wave radiation efficiency remains at a constant value.

A first curve 650 in the graph representing the radiation efficiency of the electromagnetic wave with time may represent the radiation efficiency of the electromagnetic waves radiated through the plurality of conductive members mounted on the first circuit board 610. As illustrated, the radiation efficiency of the electromagnetic waves radiated from the first circuit board 610 increases at the initial stage of radiation, and after a predetermined period of time, may remain at constant radiation efficiency.

A second curve 660 in the graph representing the radiation efficiency of the electromagnetic wave with time may represent the radiation efficiency of the electromagnetic waves radiated through the plurality of conductive members mounted on the second circuit board 620. The radiation efficiency of the electromagnetic waves radiated from the second circuit board 620 also increases at the initial stage of radiation, and after a predetermined period of time, may remain at constant radiation efficiency. However, the radiation efficiency of the electromagnetic waves emitted from the second circuit board 620 is not as high as the radiation efficiency of the electromagnetic waves radiated from the first circuit board 610. That is, a part of the electromagnetic waves radiated by the second circuit board 620 may be reflected by the ground member 630 mounted on the second face 625 of the first circuit board 610 and may not be radiated in the +Z direction.

However, the electromagnetic wave radiation efficiency of the second circuit board 620 may be improved by about 30% compared with the electromagnetic wave radiation efficiency of the second circuit board 420 of FIG. 4. The ground member 630 is mounted on a portion of the second face 615 corresponding to the position of the conductive member mounted on the first face 613 of the first circuit board 610, and the ground member 630 is not mounted in the remaining area of the second face 615, so that the electromagnetic wave radiation efficiency can be improved. That is, the electromagnetic waves radiated from the second circuit board 620 can be radiated in the +Z axis direction through the area in which the ground member 630 is not mounted on the first circuit board 610, so that the radiation efficiency of the second circuit board 620 can be increased.

A third curve 670 of the graph is the sum of the radiation efficiency of the electromagnetic waves radiated from the first circuit board 610 and the radiation efficiency of the electromagnetic waves radiated from the second circuit board 620. The radiation efficiency in the second circuit board 620 may be increased, and the total radiation efficiency of the wireless power transmission device 100 may also be increased.

Figure 7:
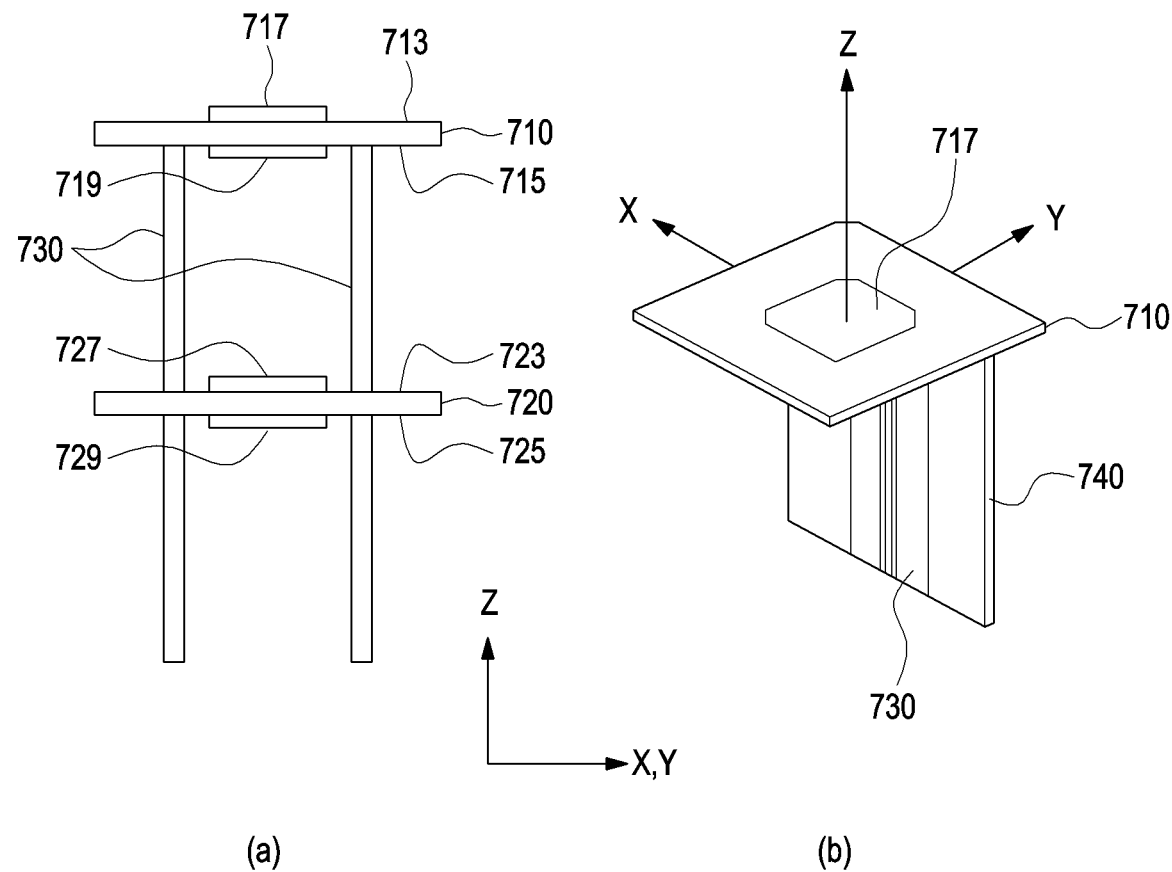
FIG. 7 is a view illustrating the case in which an electric circuit is added between a first circuit board and a second circuit board in a wireless power transmission device according to an embodiment of the disclosure.

FIG. 7 is a view illustrating the case in which an electric circuit is added between a first circuit board and a second circuit board in a wireless power transmission device according to various embodiments.

Referring to FIG. 7 (*a*), with reference to the XYZ coordinate system, the first circuit board 710 and the second circuit board 720 may be disposed with a predetermined spacing therebetween such that the first circuit board 710 and the second circuit board 720 are arranged parallel to the XY plane, that is, orthogonal to the Z axis.

The first face 713 of the first circuit board 710 may be a face oriented in the +Z axis direction, and the second face 715 may be a face oriented in the −Z axis direction. Similarly, the first face 723 of the second circuit board 720 may be a face oriented in the +Z axis direction, and the second face 725 may be a face oriented in the −Z axis direction. In this case, the second face 715 of the first circuit board 710 and the first face 723 of the second circuit board 720 may face each other. The spacing between the first circuit board 710 and the second circuit board 720 may be determined through, for example, a number of electromagnetic wave radiation tests.

According to various embodiments, a conductive member 717 may be mounted on the first face 713 of the first circuit board 710, and a ground member 719 may be mounted on the second face 715. Similarly, a conductive member 727 may be mounted on the first face 723 of the second circuit board 720, and a ground member 729 may be mounted on the second face 725.

According to various embodiments, an electric circuit 730 may be disposed between the first circuit board 710 and the second circuit board 720. The electric circuit 730 may include a circuit capable of feeding power to the first circuit board 710, a phase control circuit capable of controlling the phase of electromagnetic waves radiated from the first circuit board 710, or an amplification circuit for adjusting the output or amplitude of electromagnetic waves.

Referring to FIG. 7 (*b*), the electric circuit 730 may be mounted on the third circuit board 740. According to various embodiments, a third circuit board 740 may be disposed between the first circuit board 710 and the second circuit board 720. The third circuit board 740 is disposed at a position at which the area in which the ground member 719 is mounted on the first circuit board 710 and the area in which the conductive member 727 is mounted on the second circuit board 720 do not overlap each other.

According to various embodiments, the third circuit board 740 may be disposed between the first circuit board 710 and the second circuit board 720 so as to serve to maintain the arrangement spacing between the first circuit board 710 and the second circuit board 720. However, the disclosure is not limited thereto. For example, the first circuit board 710 may be connected to a first end of the third circuit board 740 and the second circuit board 720 is connected to a second end of the third circuit board 740, so that the third circuit board 740 may maintain the state of being fixed between the first circuit board 710 and the second circuit board 720.

As described above, the third circuit board 740 may include a circuit capable of feeding power to the first circuit board 710, a phase control circuit capable of controlling the phase of electromagnetic waves radiated from the first circuit board 710, or an amplification circuit for adjusting the output or amplitude of electromagnetic waves. However, the disclosure is not limited thereto. For example, the third circuit board 740 may further include a circuit used for signal transmission between the processor (not illustrated) that controls the wireless power transmission device and the circuit boards 710 and 720 that control the wireless power transmission device.

Figure 8:
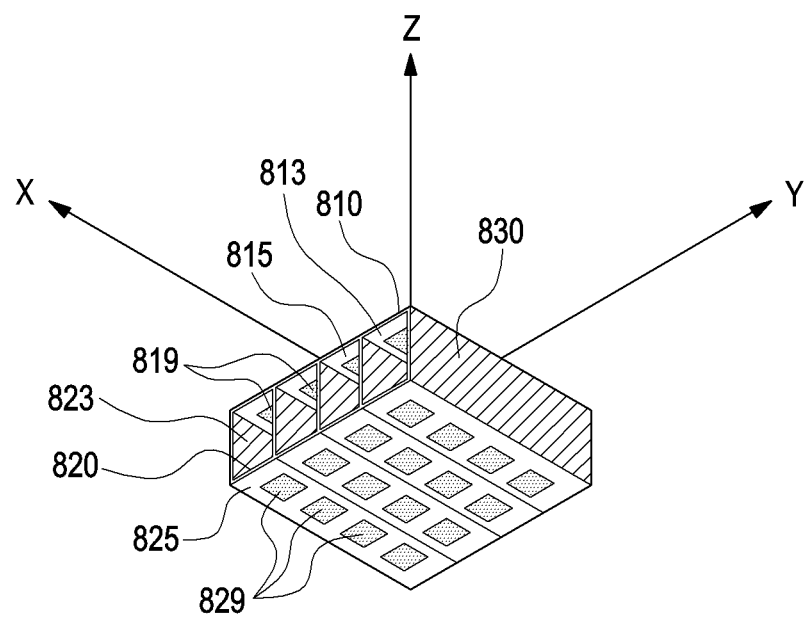
FIG. 8 is a view illustrating electromagnetic wave radiation efficiency.
Figure 8:
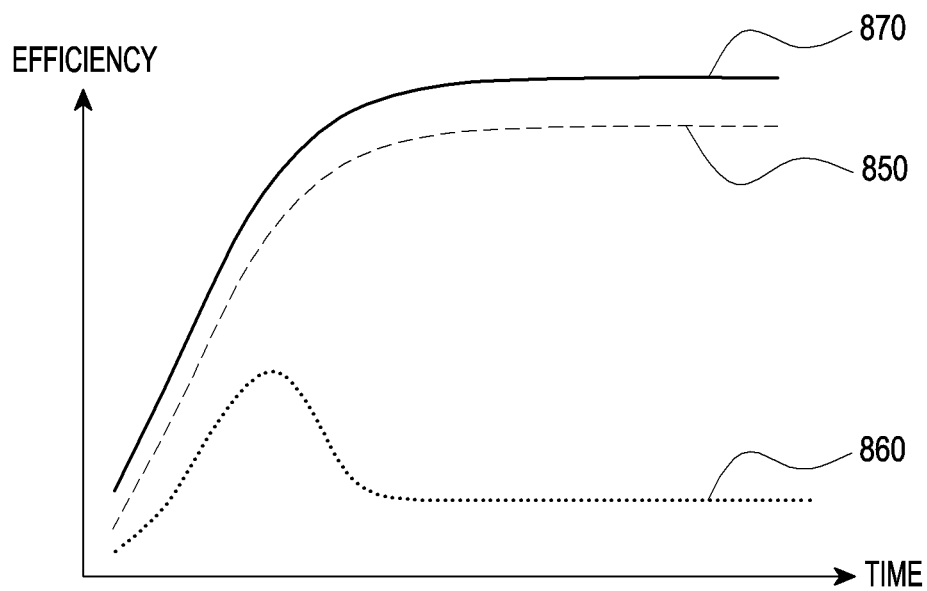

FIG. 8 is a view illustrating electromagnetic wave radiation efficiency.

Referring to FIG. 8 (*a*), the wireless power transmission device 100 may radiate electromagnetic waves using a first circuit board 810 and a second circuit board 820 on which a plurality of conductive members are arranged. With reference to the XYZ coordinate system, the first circuit board 810 and the second circuit board 820 may be arranged parallel to the XY plane, that is, orthogonal to the Z axis.

The first face 813 of the first circuit board 810 may be a face oriented in the +Z axis direction, and the second face 815 may be a face oriented in the −Z axis direction. Similarly, the first face 823 of the second circuit board 820 may be a face oriented in the +Z axis direction, and the second face 825 may be a face oriented in the −Z axis direction. In this case, the second face 815 of the first circuit board 810 and the first face 823 of the second circuit board 820 may face each other.

According to various embodiments, a plurality of conductive members (not illustrated) may be arranged on the first face 813 of the first circuit board 810 and the first face 823 of the second circuit board 820, as illustrated in FIG. 3B.

A ground member 819 may be mounted on the second face 815 of the first circuit board 810. Similarly, a ground member 830 may also be mounted on the second face 825 of the second circuit board 820.

For the radiation efficiency of electromagnetic waves of each of the circuit boards 810 and 820 as described above with reference to FIG. 5, in the wireless power transmission device 100 according to various embodiments, the ground member 819 may be mounted only in a portion of the second face 815 of the first circuit board 810, which corresponds to the position at which a conductive member (not illustrated) is mounted in the first face 813 of the first circuit board 810. Similarly, in the wireless power transmission device 100, the ground member 829 may be mounted only in a portion of the second face 825 of the second circuit board 820, which corresponds to the position at which a conductive member (not illustrated) in the first face 823 of the circuit board 820 is mounted.

According to various embodiments, third circuit boards 830 may be disposed in an area in which the plurality of ground members 819 and 829 are not located. As described above, the third circuit boards 830 may include a circuit capable of feeding power to the first circuit board 810, a phase control circuit capable of controlling the phase of electromagnetic waves radiated from the first circuit board 810, or an amplification circuit for adjusting the output or amplitude of electromagnetic waves.

According to various embodiments, the wireless power transmission device 100 may feed power to the first circuit board 810 and the second circuit board 820 using an electric circuit (not illustrated). In this case, the wireless power transmission device 100 may radiate electromagnetic waves in the +Z axis direction.

FIG. 8 (b) is a view representing the electromagnetic wave radiation efficiency of the wireless power transmission device 100 having the structure illustrated in FIG. 8 (a).

Referring to the graph of FIG. 8 (b), the X axis may represent time and the Y axis may represent electromagnetic wave radiation efficiency. It can be seen that at the initial stage of radiating the electromagnetic waves by the wireless power transmission device 100, the electromagnetic wave radiation efficiency increases as a whole, and, after a predetermined period of time, the electromagnetic wave radiation efficiency remains at a constant value.

A first curve 850 of the graph may represent the electromagnetic wave radiation efficiency of the first circuit substrate 810. As illustrated, the radiation efficiency of the electromagnetic waves radiated from the first circuit board 810 increases at the initial stage of radiation, and after a predetermined period of time, may remain at constant radiation efficiency.

A second curve 860 of the graph may represent the radiation efficiency of the electromagnetic waves radiated from the second circuit substrate 820. It can be seen that the radiation efficiency of the electromagnetic waves radiated from the second circuit board 820 also increases at the initial stage of radiation, and after a predetermined period of time, may remain at constant radiation efficiency.

However, the radiation efficiency in the second circuit board 820 is not as high as the radiation efficiency in the first circuit board 810. However, the electromagnetic wave radiation efficiency in the second circuit board 820 may be improved by about 25% compared with the electromagnetic wave radiation efficiency in the second circuit board 420 of FIG. 4. The ground member 829 is mounted on an area of the second face 815 corresponding to the position of the conductive member (not illustrated) mounted on the first face 813 of the first circuit board 810, and the ground member 829 is not mounted in the remaining area of the second face 815, so that the electromagnetic wave radiation efficiency can be improved. That is, the electromagnetic waves radiated from the second circuit board 820 can be radiated in the +Z axis direction through the area in which the ground member 819 is not mounted on the first circuit board 810, so that the radiation efficiency of the second circuit board 820 can be increased.

According to various embodiments, the third circuit board 830 is able to reflect a part of the electromagnetic waves radiated from the second circuit board 820, which is different from the radiation efficiency of the second circuit board 620 described above with reference to FIG. 6.

A third curve 870 of the graph is the sum of the radiation efficiency in the first circuit board 810 and the radiation efficiency in the second circuit board 820. It can be seen that the radiation efficiency in the second circuit board 820 may be increased, and the total radiation efficiency of the wireless power transmission device 100 may also be increased.

Figure 9:
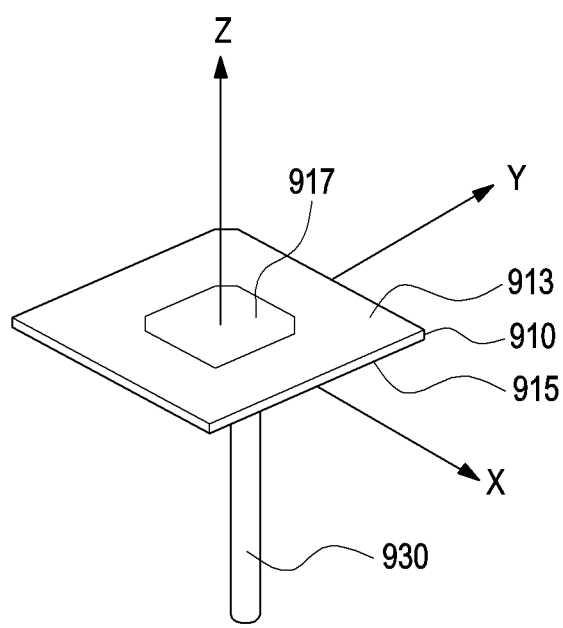
FIG. 9 is a view illustrating the case in which a coaxial cable is added between a first circuit board and a second circuit board in a wireless power transmission device according to an embodiment of the disclosure.

FIG. 9 is a view illustrating the case in which a coaxial cable is added between a first circuit board and a second circuit board in a wireless power transmission device according to various embodiments.

Referring to FIG. 9, with reference to the XYZ coordinate system, a first circuit board 910 may be arranged parallel to the XY plane, that is, orthogonal to the Z axis.

The first face 913 of the first circuit board 910 may be a face oriented in the +Z axis direction, and the second face 915 may be a face oriented in the −Z axis direction. According to various embodiments, a conductive member 917 may be mounted on the first face 913 of the first circuit board 910, and a ground member (not illustrated) may be mounted on the second face 915. According to various embodiments, a transmission line 930 may be connected to the first circuit substrate 910. The transmission line 930 may include, for example, a coaxial cable. The wireless power transmission device 100 may feed power to the first circuit board 910 using the coaxial cable 930. In this case, a phase controller (not illustrated) for controlling the phase of the electromagnetic wave, an amplification circuit (not illustrated) for controlling the output or amplitude of the electromagnetic waves, and the like can be mounted in different areas in the wireless power transmission device 100.

As described above, when the coaxial cable 930 for power feeding is disposed between the first circuit board 910 and another circuit board (not illustrated), the area occupied by the coaxial cable 930 between the first circuit board 910 and the other circuit board (not illustrated) is reduced, so that the radiation efficiency of electromagnetic waves radiated from the other circuit board (not illustrated) can be further improved.

Figure 10:
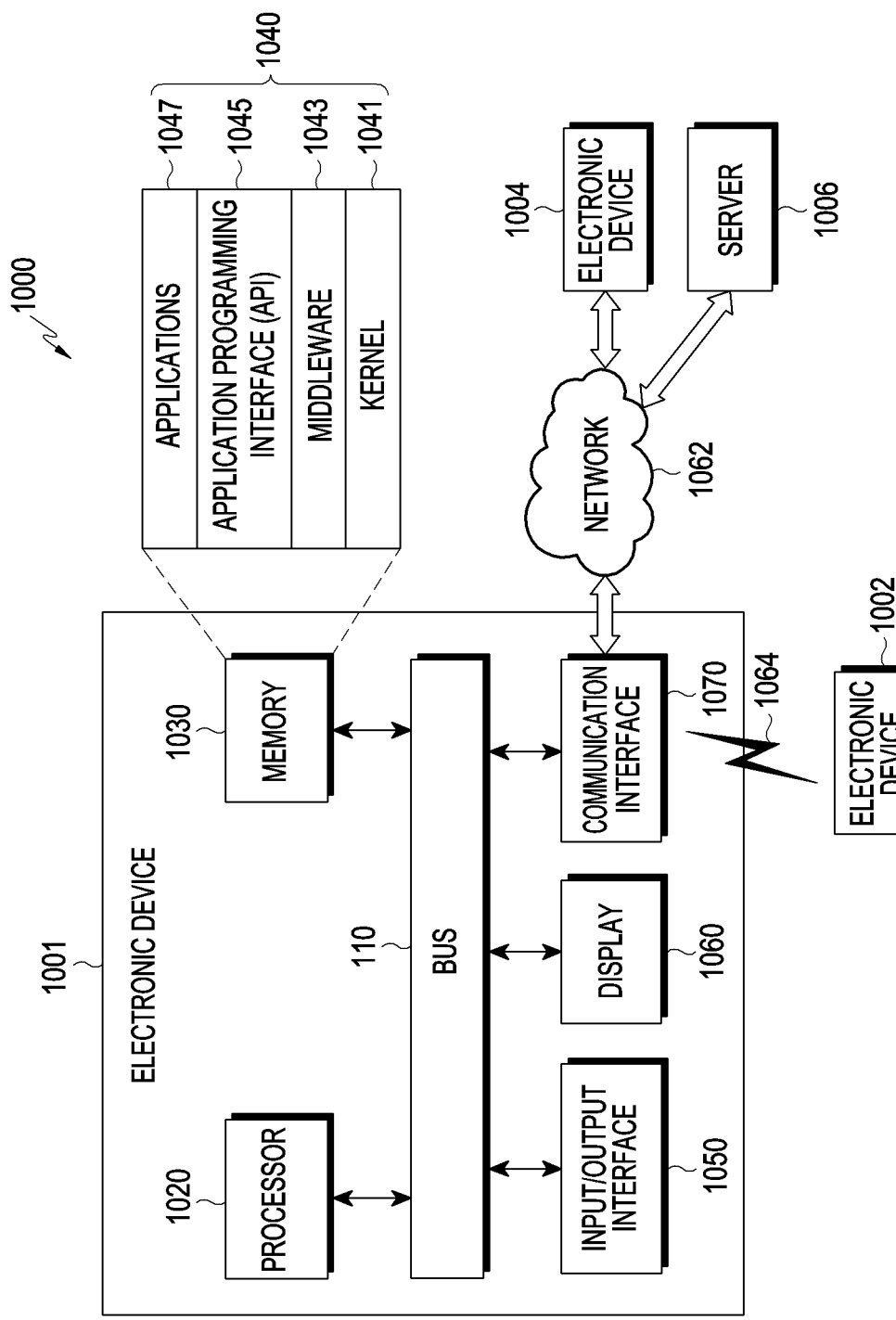
FIG. 10 is a view illustrating an electronic device according to an embodiment of the disclosure within a network environment.

An electronic device 1001 within a network environment 1000 in various embodiments will be described with reference to FIG. 10. The electronic device 1001 may include a bus 1010, a processor 1020, a memory 1030, an input/output interface 1050, a display 1060, and a communication interface 1070. The electronic device 1001 may include a wireless power transmission device 100 of FIG. 1. In some embodiments, at least one of the above-mentioned components may be omitted from the electronic device 1001, or the electronic device may be additionally provided with other components.

The bus 1010 may include a circuit that interconnects the above-mentioned components 1010 to 1070 and transmits communication information (e.g., a control message or data) between the components. The processor 1020 may include one or more of a Central Processing Unit (CPU), an Application Processor (AP), and a Communication Processor (CP). The processor 1020 may execute, for example, an arithmetic operation or data processing that is related to a control and/or communication of one or more other components of the electronic device 1001.

The memory 1030 may include volatile memory and/or nonvolatile memory. The memory 1030 may store, for example, commands or data that are related to one or more other components of the electronic device 1001. The program 1040 may include, for example, kernel 1041, middleware 1043, an Application Programming Interface (API) 1045, and/or an application 1047. At least one of the kernel 1041, the middleware 1043, and the API 1045 may be referred to as an Operating System (OS). The kernel 1041 may control or manage, for example, system resources (e.g., the bus 1010, the processor 1020, and the memory 1030) that are used for executing operations or functions implemented in the other programs (e.g., the middleware 1043, the API 1045, or the application 1047). In addition, the kernel 1041 may provide an interface that allows the middleware 1043, the API 1045, or the application 1047 to access individual components of the electronic device 1001 so as to control or manage the system resources.

The middleware 1043 may play an intermediary role such that, for example, the API 1045 or the application 1047 may communicate with the kernel 1041 so as to exchange data. In addition, the middleware 1043 may process one or more task requests which are received from the applications 1047, according to priority. The API 1045 is, for example, an interface that allows the applications 1047 to control functions provided from the kernel 1041 or the middleware 1043, and may include, for example, one or more interfaces or functions (e.g., commands) for a file control, a window control, an image processing control, or a character control. The input/output interface 1050 may transmit commands or data, which are entered from, for example, a user or any other external device, to the other component(s) of the electronic device 1001, or may output commands or data, which are received from the other component(s) of the electronic device 1001, to the user or the other external device.

The display device 1060 may include, for example, a Liquid Crystal Display (LCD), a Light Emitting Diode (LED) display, an Organic Light Emitting Diode (OLED) display, a MicroElectroMechanical System (MEMS) display, or an electronic paper display. The communication interface 1070 may set, for example, communication between the electronic device 1001 and an external device (e.g., a first external electronic device 1002, a second external device 1004, or a server 1006). For example, the communication interface 1070 may be connected with a network 1062 through wired or wireless communication so as to communicate with the external device (e.g., the second external electronic device 1004 or the server 1006).

The wireless communication may include a cellular communication that uses at least one of, for example, Long-Term Evolution (LTE), LTE Advance (LTE-A), Code Division Multiple Access (CDMA), Wideband CDMA (WCDMA), Universal Mobile Telecommunication System (UMTS), Wireless Broadband (WiBro), and Global System for Mobile communication (GSM). According to an embodiment, the wireless communication may include at least one of, for example, Wi-Fi, Bluetooth, Bluetooth Low Energy (BLE), ZigBee, Near Field Communication (NFC), Magnetic Secure Transmission, Radio Frequency (RF), and Body Area Network (BAN). According to an embodiment, the wireless communication may include GNSS. The GNSS may include, for example, at least one of Global Positioning System (GPS), Global Navigation Satellite System (Glonass), Beidou Navigation Satellite System (hereinafter, "Beidou"), and Galileo—the European Global Satellite-based navigation system. Hereinafter, in this disclosure, "GPS" and "GNSS" may be interchangeably used. The wired communication may use at least one of, for example, Universal Serial Bus (USB), High-Definition Multimedia Interface (HDMI), Recommended Standard 232 (RS-232), and Plain Old Telephone Service (POTS). The network 162 may include a telecommunication network (e.g., at least one of a computer network (e.g., LAN or WAN), the Internet, and a telephone network).

Each of the first and second external electronic devices 1002 and 1004 may be of a type, which is the same as or different from the electronic device 1001. The electronic device 1001 may provide requested functions or services by processing received results as they are or additionally. For this purpose, for example, a cloud computing technology, a distributed computing technology, or a client-server computing technology may be used.

Figure 11:
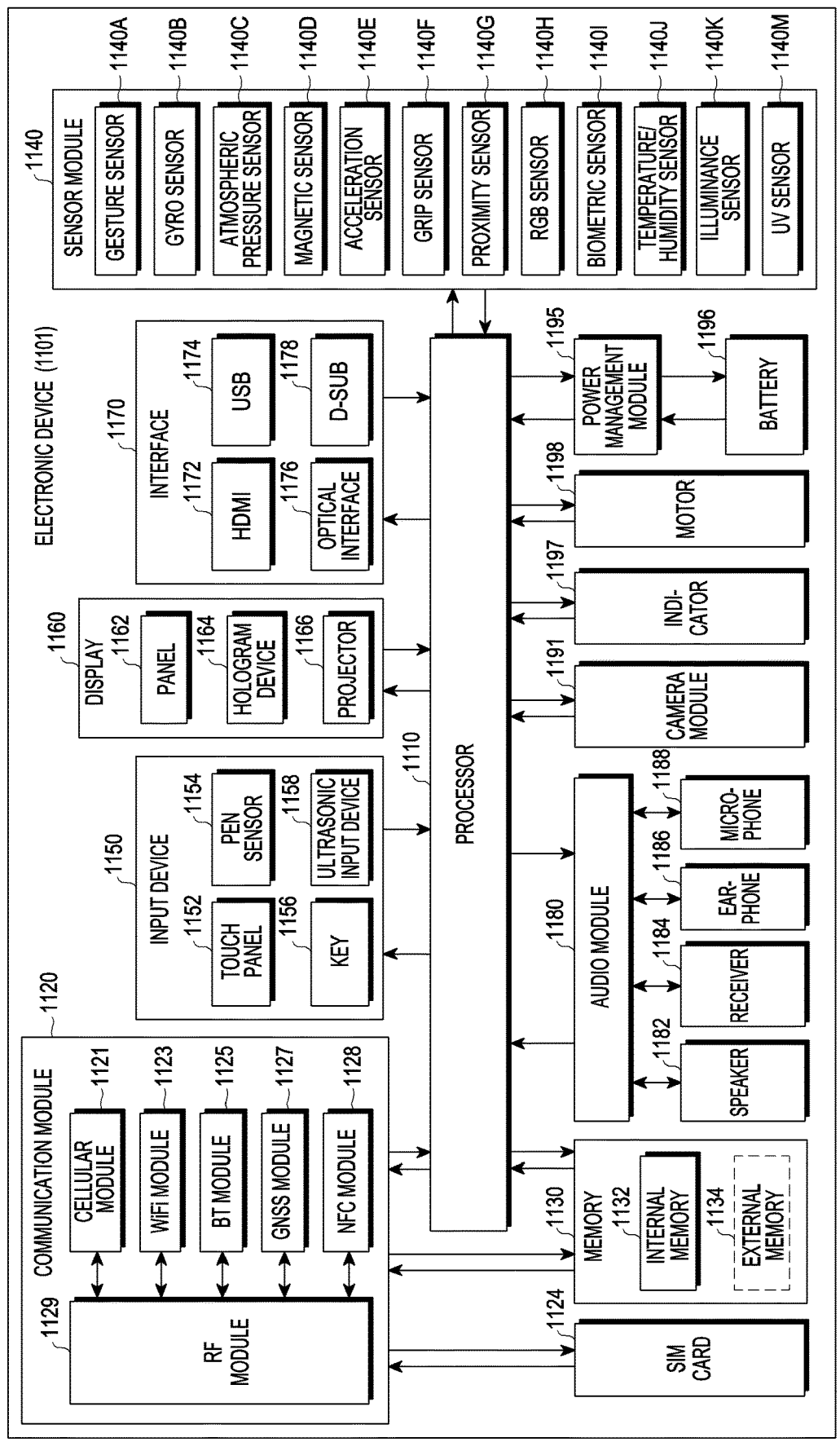
FIG. 11 is a view illustrating a configuration of an electronic device according to various embodiments of the disclosure.

FIG. 11 is a block diagram of an electronic device 1101 according to various embodiments. The electronic device 1101 may include a wireless power transmission device 100 of FIG. 1. In some embodiments, at least one of the above-mentioned components may be omitted from the electronic device 1101, or the electronic device may be additionally provided with other components.

The electronic device 1101 may include at least one processor (e.g., an AP) 1110, a communication module 1120, a subscriber identification module 1124, a memory 1130, a sensor module 1140, an input device 1150, a display 1160, an interface 1170, an audio module 1180, a camera module 1191, a power management module 1195, a battery 1196, an indicator 1197, and a motor 1198.

The processor 1110 may drive, for example, an operating system or an application so as to control a plurality of hardware or software components connected thereto, and may also perform various data processing and arithmetic operations. The processor 1110 may be implemented using, for example, a System-on-Chip (SoC).

The communication module 1120 may have a configuration that is the same as or similar to the communication interface 1070. The communication module 1120 may include, for example, a cellular module 1121, a Wi-Fi module 1123, a Bluetooth module 1125, a GNSS module 1127, an NFC module 1128, and a RF module 1129. The cellular module 1121 may provide, for example, a voice call, a video call, a message service, or an internet service through a communication network.

According to an embodiment, the cellular module 1121 may perform discrimination and authentication of the electronic device 1101 within the communication network by using the subscriber identification module (e.g., a SIM card) 1124. According to an embodiment, the cellular module 1121 may perform at least some of the multimedia control functions that may be provided by the processor 1110. According to an embodiment, the cellular module 1121 may include a Communication Processor (CP).

According to some embodiments, at least some (e.g., two or more) of the cellular module 1121, the Wi-Fi module 1123, the Bluetooth module 1125, the GNSS module 1127, and the NFC module 1128 may be incorporated in a single Integrated Chip (IC) or an IC package. The RF module 1129 may transmit/receive a communication signal (e.g., an RF signal). The RF module 1129 may include, for example, a transceiver, a Power Amp Module (PAM), a frequency filter, a Low-Noise Amplifier (LNA), or an antenna. According to another embodiment, at least one of the cellular module 1121, the Wi-Fi module 1123, the Bluetooth module 1125, the GNSS module 1127, and the NFC module 1128 may transmit/receive an RF signal through at least one separate RF module. The subscriber identification module 1124 may include, for example, a card that includes a subscriber identification module and/or an embedded SIM, and may also include intrinsic identification information (e.g., Integrated Circuit Card IDentifier (ICCID)) or subscriber information (e.g., International Mobile Subscriber Identity (IMSI)).

The memory 130 (e.g., the memory 1030) may include, for example, an internal memory 1132 or an external memory 1134. The internal memory 1132 may include at least one of, for example, volatile memory (e.g., DRAM, SRAM, or SDRAM), and non-volatile memory (e.g., One Time Programmable ROM (OTPROM), PROM, EPROM, EEPROM, mask ROM, flash ROM, flash memory, hard drive, and Solid-State Drive (SSD)). The external memory 1134 may further include flash drive (e.g., Compact Flash (CF), Secure Digital (SD), Micro Secure Digital (Micro-SD), Mini Secure Digital (Mini-SD), extreme Digital (xD), Multi-Media Card (MMC), or memory stick). The external memory 1134 may be functionally or physically connected to the electronic device 1101 through various interfaces.

For example, the sensor module 1140 may measure a physical quantity or may sense an operating status of the electronic device 1101, and may then convert the measured or sensed information into electric signals. The sensor module 1140 may include at least one of, for example, a gesture sensor 1140A, a gyro sensor 1140B, an atmospheric pressure sensor 1140C, a magnetic sensor 1140D, an acceleration sensor 1140E, a grip sensor 1140F, a proximity sensor 1140G, a color sensor 1140H (e.g., RGB (Red, Green, Blue) sensor), a biometric sensor 1140I, a temperature/humidity sensor 1140J, an illuminance sensor 1140K, and an Ultra-Violet (UV) sensor 1140M.

The input device 1150 may include, for example, a touch panel 1152, a (digital) pen sensor 1154, a key 1156, or an ultrasonic input device 1158. As the touch panel 1152, at least one of, for example, a capacitive-type touch panel, a resistive-type touch panel, an infrared-type touch panel, and an ultrasonic-type panel may be used. Also, the touch panel 1152 may further include a control circuit.

The key 1156 may include, for example, a physical button, an optical key, or a keypad. The ultrasonic input device 1158 may sense, through a microphone (e.g., a microphone 1188), ultrasonic waves generated by an input tool so as to confirm data corresponding to the sensed ultrasonic waves.

The display 1160 (e.g., the display 1060) may include a panel 1162, a hologram device 1164, a projector 1166, and/or a control circuit for controlling these components. The panel 1162 may be implemented to be, for example, flexible, transparent, or wearable. The panel 1162 may be constituted with the touch panel 1152 and one or more modules.

The hologram device 1164 may show a stereoscopic image in the air using interference of light. The projector 1166 may project light onto a screen so as to display an image. The screen may be located, for example, inside or outside the electronic device 1101.

The interface 1170 may include, for example, an HDMI 1172, a USB 1174, an optical interface 1176, or a D-sub-miniature (D-sub) 1178. For example, the interface 1170 may be included in the communication interface 1070 illustrated in FIG. 10.

The audio module 1180 may bi-directionally convert, for example, sound and electric signals. At least some of the components of the audio module 1180 may be included in, for example, the input/output interface 1045 illustrated in FIG. 10. The audio module 1180 may process sound information input or output through, for example, a speaker 1182, a receiver 1184, an earphone 1186, or a microphone 1188.

The camera module 1191 is a device that is capable of photographing, for example, a still image and a video image, and according to an embodiment, the camera module 2910 may include at least one image sensor (e.g., a front sensor or a rear sensor), a lens, an Image Signal Processor (ISP), or a flash (e.g., an LED or a xenon lamp). The power management module 1195 may manage, for example, the electric power of the electronic device 1101. According to an embodiment, the power management module 1195 may include a Power Management Integrated Circuit (PMIC), a charger Integrated Circuit (IC), or a battery or fuel gauge. The PMIC may be configured as a wired and/or wireless charge type. The wireless charging type may include, for example, a magnetic resonance type, a magnetic induction type, or an electromagnetic wave type, and may further include an additional circuit for wireless charging (e.g., a coil loop, a resonance circuit, or a rectifier). The battery gauge may measure the residual capacity of the battery 1196, and a voltage, a current, or a temperature during the charge. The battery 1196 may include, for example, a rechargeable battery and/or a solar battery.

The indicator 1197 may indicate a specific status (e.g., a booting status, a message status, or a charged status) of the electronic device 1101 or of a part thereof (e.g., the processor 1110). The motor 1198 may convert an electric signal into a mechanical vibration, and may generate, for example, a vibration or a haptic effect.

Each of the above-described component elements of hardware according to the disclosure may be configured with one or more components, and the names of the corresponding component elements may vary based on the type of electronic device. According to various embodiments, the electronic device (for example, the electronic device 1101) may not include some elements, or may further include additional elements. Some elements may be coupled to constitute one object, but the electronic device may perform the same functions as those of the corresponding elements before being coupled to each other.

According to various embodiments, at least some of the devices (for example, modules or functions thereof) or the method (for example, operations) according to the disclosure may be implemented by a command stored in a computer-readable storage medium in a programming module form. When the command is executed by one or more processors, the one or more processors may perform a function corresponding to the command. The computer-readable storage medium may be, for example, the memory 260.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the disclosure, and vice versa.

The programming module according to the disclosure may include one or more of the aforementioned components or may further include other additional components, or some of the aforementioned components may be omitted. Operations executed by a module, a programming module, or other component elements according to various embodiments of the disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the disclosure and to help the understanding of the disclosure, and are not intended to limit the scope of the disclosure. Therefore, it should be construed that all modifications and changes or modified and changed forms based on the technical idea of the disclosure fall within the scope of the disclosure.

The invention claimed is:

1. A wireless power transmission device that radiates electromagnetic waves, the wireless power transmission device comprising:
    a first circuit board;
    a first conductive member mounted on a first face of the first circuit board;
    a first ground member mounted on a second face of the first circuit board, the first and second faces of the first circuit board facing away from each other; a transmission line disposed in the second face of the first circuit board at a position which does not overlap the first ground member, the transmission line being configured to supply power to the first circuit board;
    a second circuit board;
    a second conductive member mounted on a first face of the second circuit board;
    a second ground member mounted on a second face of the second circuit board, the first and second faces of the second circuit board facing away from each other; and
    a third circuit board disposed orthogonally to the first circuit board and the second circuit board,
    wherein the first face of the second circuit board is disposed to face the second face of the first circuit board,
    wherein an electric circuit is mounted on the third circuit board, and
    wherein the electric circuit controls one of an output and a phase of the radiated electromagnetic waves.

2. The wireless power transmission device of claim 1, wherein the first ground member is mounted in a portion of the second face of the first circuit board corresponding to a position at which the first conductive member is mounted.

3. The wireless power transmission device of claim 1, wherein the second ground member is mounted in a portion of the second face of the second circuit board corresponding to a position at which the second conductive member is mounted.

4. The wireless power transmission device of claim 1, further comprising an insulator disposed between the first face of the first circuit board on which the first conductive member is mounted and the second face of the first circuit board on which the first ground member is mounted.

5. The wireless power transmission device of claim 1, wherein the transmission line comprises a coaxial cable.

* * * * *